(12) United States Patent
Yang et al.

(10) Patent No.: US 9,819,379 B2
(45) Date of Patent: *Nov. 14, 2017

(54) POWER BANK AND PROTECTIVE CASE THEREOF

(71) Applicant: Mobileconn Technology Co., LTD, New Taipei (TW)

(72) Inventors: Chung-Kai Yang, New Taipei (TW); Chin-Tien Lin, Taipei (TW)

(73) Assignee: MOBILECONN TECHNOLOGY CO., LTD., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/066,017

(22) Filed: Mar. 10, 2016

(65) Prior Publication Data

US 2017/0019511 A1 Jan. 19, 2017

(30) Foreign Application Priority Data

Jul. 13, 2015 (TW) .............................. 104211241 U

(51) Int. Cl.
| H04B 1/3888 | (2015.01) |
| H04M 1/725 | (2006.01) |
| H04M 1/18 | (2006.01) |
| H04M 1/02 | (2006.01) |

(52) U.S. Cl.
CPC ...... *H04B 1/3888* (2013.01); *H04M 1/72527* (2013.01); *H04M 1/0274* (2013.01); *H04M 1/185* (2013.01)

(58) Field of Classification Search
CPC ............ H04B 1/3888; H04M 1/72527; H04M 1/185; H04M 1/0274
See application file for complete search history.

(56) References Cited

U.S. PATENT DOCUMENTS

2015/0280770 A1* 10/2015 Rhee .................... H04B 1/3888
455/575.8
2016/0042202 A1* 2/2016 Murray .................. G06F 1/203
320/108

\* cited by examiner

*Primary Examiner* — Joseph Dean, Jr.
(74) *Attorney, Agent, or Firm* — Li & Cai Intellectual Property (USA) Office

(57) ABSTRACT

A power bank adapting to a protective case is disclosed. The protective case protects a mobile communication device. The protective case has an accommodating portion and a first connecting portion. The mobile communication device is removably disposed in the accommodating portion. The power bank includes a cover plate assembly and a power bank. The cover plate assembly includes a lid portion, a folded portion and a second connecting portion. The folded portion is connected between the lid portion and the second connecting portion. The power module disposes in the cover plate assembly. The cover plate assembly is for assembling with the protective case.

11 Claims, 4 Drawing Sheets

POWER BANK AND PROTECTIVE CASE THEREOF

BACKGROUND

1. Technical Field

The present disclosure is related to a power bank and a protective case with the same power bank. Especially, this present disclosure is suitable for a mobile communication device.

2. Description of Related Art

In today's market, a power bank usually includes a storage battery and control circuit board in a main body of the power bank, and configures at least a USB transmission interface on the main body. When charging, power stored in the storage battery can be converted by the control circuit board into the appropriate voltage and current. Then, the appropriate voltage and current are provided to a user's mobile device via the USB transmission interface. With the high market growth of smart phones, tablet computers and other mobile devices, and mobile devices developing toward big screen and multi-core, power consumption has increased significantly. In recent years, power bank demand has greatly grown to keep up with the development of simulated actions of the mobile devices.

However, whether smart phones or tablet computers, these operations typically require additional power supply transmission lines to transmit power; moreover, when the power of the battery has run down, this kind of power bank needs a power transformer charger to recharge. That is, users need to carry the power bank, the power supply transmission lines and the power transformer when going out, which is quite troublesome and inconvenient.

SUMMARY

The instant disclosure provides a power bank and its protective case, which is used for charging a mobile communication device through a design with a power module.

The instant disclosure provides a power bank, adapted to a protective case. The protective case protects a mobile communication device. The protective case includes an accommodating portion and a first connecting portion. The mobile communication device removably disposes in the accommodating portion. The power bank includes a cover plate assembly and a power module. The cover plate assembly includes a lid portion, a folded portion and a second connecting portion. The folded portion connects between the lid portion and the second connecting portion. The power module disposes in the cover plate assembly. The cover plate assembly is for assembling with the protective case.

The instant disclosure provides a protective case. The protective case adapts to install a mobile communication device. The protective case includes an accommodating portion and a power bank. The accommodating portion houses the mobile communication device. The power bank assembles with the accommodating portion.

To sum up, the exemplary embodiments of the present disclosure provide a power bank and a protective case with the same power bank, for charging and protecting a mobile communication device through an assembled design with a power bank. Wherein, the protective case is for housing and protecting the mobile communication device, which can be a smart phone, to make the mobile communication device get the best protection effect. The present disclosure really enhances the ease of operation, efficiency and quality of the smart ultra box and its protective case.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
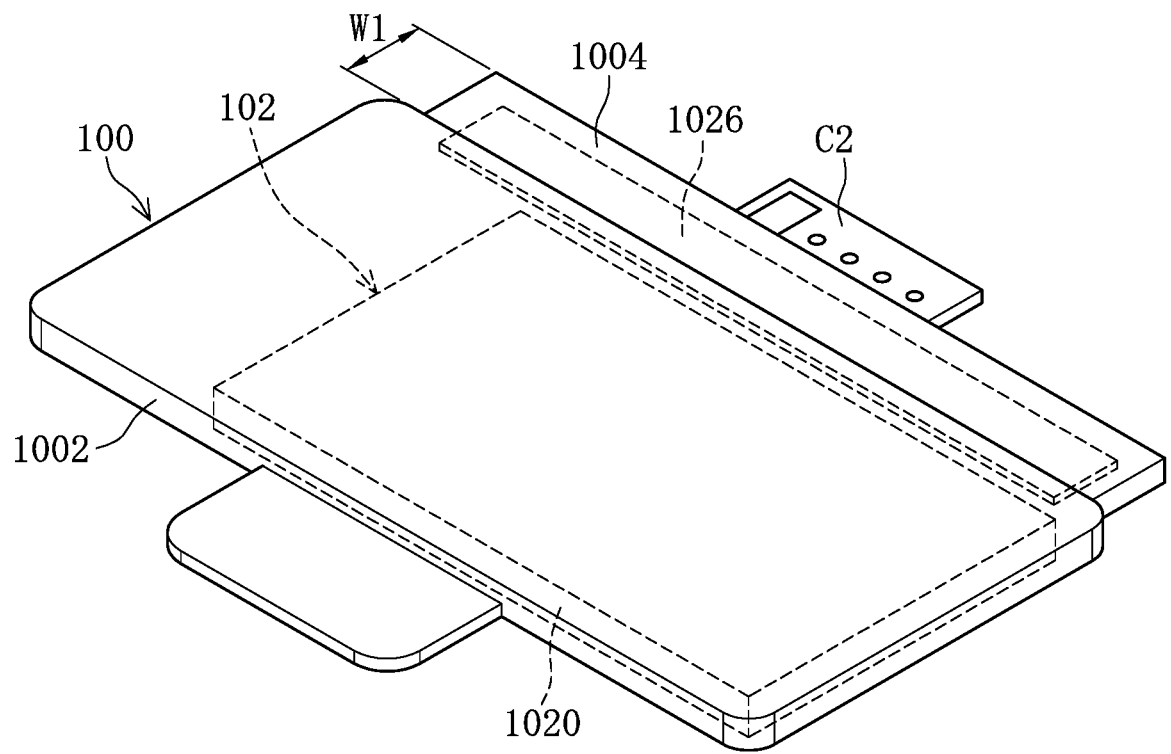
FIG. 1 is a schematic diagram of a power bank according to an exemplary embodiment of the instant disclosure.

Example embodiments will be described below in more detail with reference to the accompanying drawings. Many different forms and embodiments are possible without deviating from the spirit and teachings of this disclosure and so the disclosure should not be construed as limited to the embodiments set forth herein. Rather, these embodiments are provided so that this disclosure will be thorough and complete, and will fully convey the scope of the disclosure to those skilled in the art. In the drawings, the sizes and relative sizes of layers and regions may be exaggerated for clarity. Like reference numbers refer to like elements throughout.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below and hence, a first element, component, region, layer or section may be termed as a second element, component, region, layer or section without departing from the teachings of the present disclosure. As used herein, the term "and/or" includes any and all combinations of one or more of the associated listed items.

The following is to describe a power bank and a protective case via a plurality of embodiments with corresponding drawings. However, the embodiments below are not for restricting the scope of the instant disclosure.

Please refer to FIG. 1, which is a schematic diagram of a power bank according to an exemplary embodiment of the instant disclosure. The power bank 10 includes a cover plate assembly 100 and a power module 102. For convenience of explanation, the power bank 10 uses a protective cover plate of the mobile phone protective case to illustrate, but the present disclosure does not limit states of the protective case. The cover plate assembly 100 includes a lid portion 1002, a folded portion 1004 and a second connecting portion C2. The folded portion 1004 is connected between the lid portion 1002 and the second connecting portion C2. The cover plate assembly 100 is an upper cover plate of the mobile phone protective case 1, to cover a touch screen or display screen of the mobile phone. The above disclosure is not intended to limit the cover plate assembly 100 of the present invention.

The folded portion 1004 has a width W1 which is greater than a thickness of the mobile phone. The lid portion 1002 is used to cover the touch screen or display screen of the mobile phone. The area of the lid portion 1002 is larger than the area of the folded portion 1004. The folded portion 1004 is a rotation structure, pivoting structure or folded structure for connecting between the lid portion 1002 and the protective case. The second connecting portion C2 is used for connecting or assembling with the protective case. The above disclosure is not intended to limit the lid portion 1002, the folded portion 1004 and the second connecting portion C2 of the present invention.

The power module 102 configures to the cover plate assembly 100. The power module 102 disposes on the lid portion 1002. The power module 102 implements through at least one battery to transmit and receive power. Wherein, the battery can combine with a converting circuit, a switch circuit, a control circuit and/or a combination of one or more thereof. The above disclosure is not intended to limit the power module 102 of the present invention.

The second connecting portion C2 has a magnetic button assembly, and the second connecting portion C2 is an electrical connection port. The second connecting portion C2 of the present embodiment is an electromagnet used for generating mutual magnetic attraction with the first connecting portion C1 when the electromagnet is energized. In other embodiments, the second connecting portion C2 can be a power connection port or a data transmitting port. The above disclosure is not intended to limit the first connecting portion C1 and the second connecting portion C2 of the present invention.

Figure 2:
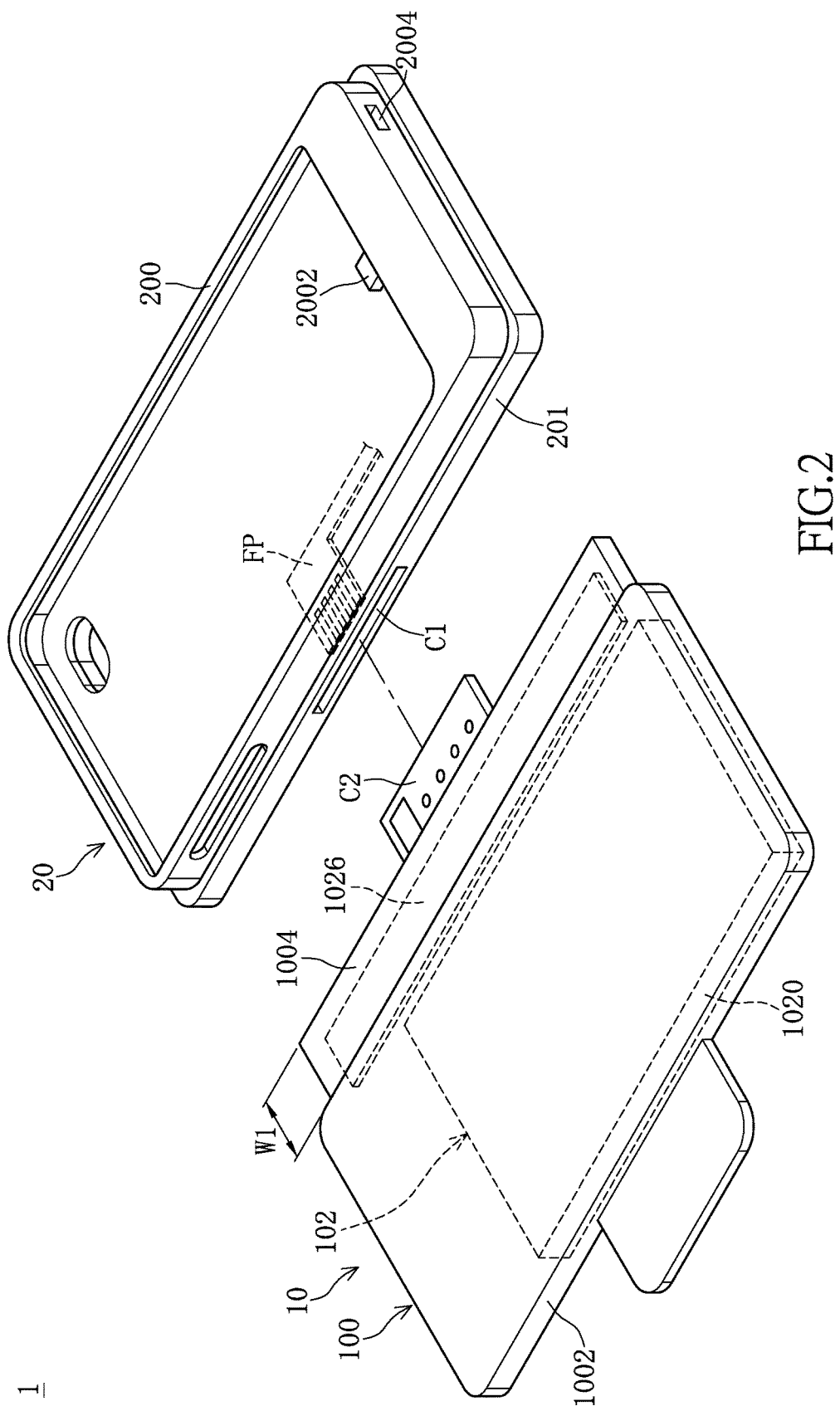
FIG. 2 is a schematic diagram of a power bank and a protective case according to FIG. 1 provided in accordance with the exemplary embodiment of the present disclosure.

FIG. 2 is a schematic diagram of a power bank and a protective case according to FIG. 1 provided in accordance with the exemplary embodiment of the present disclosure. Please refer to FIG. 2. There is a power bank 10 adapted to a protective case 20. The protective case 20 is used for protecting a mobile communication device 9. The protective case 20 includes an accommodating portion 200 and a first connecting portion C1. The mobile communication device 9 is removably disposed on the accommodating portion 200. The mobile communication device 9 is a smart phone, a tablet computer or a personal digital assistant (PDA). For convenience of explanation, the mobile communication device 9 of the present disclosure uses a mobile phone to illustrate, but the present disclosure does not limit the mobile communication device.

The lid portion 1002 revolves and covers the accommodating portion 200 via the folded portion 1004. That is, the lid portion 1002 is used to cover the accommodating portion 200. And the lid portion 1002 revolves to a cover plate position via the folded portion 1004. The cover plate position is a relative position of the lid position 1002 with respect to the accommodating portion 200. In addition, the cover plate assembly 100 is for assembling with the protective case 20. The cover plate assembly 100 and the protective case 20 assemble with each other to form a mobile phone protective case 1 with a protective cover plate.

On the other hand, when the lid portion 1002 covers a touch screen of the mobile phone, the folded portion 1004 disposes on the mobile phone side, and the width W1 of the folded portion 1004 is greater than a thickness of the mobile phone (as shown in FIG. 1). When the lid portion 1002 uncovers the touch screen of the mobile phone, the touch screen is exposed. The folded portion 1004 extends from the protective case 20 and connects to the lid portion 1002. Whereby, the lid portion 1002 revolves with respect to the position of the protective case 20. That is, the lid portion 1002 can cover or expose the touch screen via the folded portion 1004.

Additionally, the cover plate assembly 100 and the protective case respectively are nano-materials, environmental protection materials, plastic materials, leather, cloth, paper, metal, or other mineral materials. The cover plate assembly 100 and the protective case provide features such as anti-dust, anti-scratch, anti-bump and waterproofing, etc. Thereby, the cover plate assembly 100 and the protective case avoid dust accumulation or damage to openings and connecting ports of the mobile phone.

The cover plate assembly 100 and the protective case 20 assemble with each other to form a mobile phone protective case 1. The power module 102 configures to the cover plate assembly 100. The power module 102 provides power to the mobile phone via a combination of the first connecting portion C1 and the second connecting portion C2.

The protective case 20 includes a bottom plate portion 201, an accommodating portion 200 and a first connecting portion C1. The first connecting portion C1 disposes on the bottom plate portion 201. The accommodating portion 200 connects to the bottom plate portion 201. The protective case 20 of the present embodiment can be regarded as a mobile phone protective case 1. The accommodating portion 200 is for housing the mobile phone. Wherein, the accommodating portion 200 is configured with a camera lens opening, a phone keypad opening, a charging opening, or other openings. Thus, all features and functions of the smart phone are completely usable through the openings of the accommodating portion 200. The above disclosure is not intended to limit the protective case 20 of the present invention.

The bottom plate portion 201 is an outer casing of the protective case 20. There is a flexible printed circuit board FP extending to a first connecting portion C1 from the outer casing. A terminal of the flexible printed circuit board FP electrically connects to the first connecting portion C1. In other embodiments, the first connecting portion C1 can be disposed on any outer side of the accommodating portion 200. Thus, the power bank 10 assembles with the accommodating portion 200 to form the mobile phone protective case 1 with a protective cover. A person of ordinary skill in the art could design positions of the first connecting portion C1 freely.

A second connecting portion C2 electrically connects to the first connecting portion C1. The first connecting portion C1 and the connecting portion C2 of the present embodiment respectively have a magnetic button assembly. The second connecting portion C2 of the present embodiment is an electromagnet used for generating mutual magnetic attraction with the first connecting portion C1 when the electromagnet is energized.

The second connecting portion C2 connects to the first connecting portion C1 via engaging, mating, magnetic snapping or otherwise. Since the second connecting portion C2 electrically connects to the first connecting portion C1, a power module 102 transmits electric power to the mobile phone via the second connecting portion C2 and the first connecting portion C1. That is, due to the second connecting portion C2 assembling with the first connecting portion C1, the power module 102 supplies power to the mobile phone.

When the cover plate assembly 100 and the protective case 20 are in a separate state and unconnected, the cover plate assembly 100 can be regarded as a separate power bank. When the cover plate assembly 100 and the protective case 20 are in a connected state, the cover plate assembly 100 can be regarded as a protective cover of the mobile phone. The cover plate assembly 100 and the protective case 20 are used for covering the mobile phone, or to make the touch screen of the mobile phone exposed. Charging power of the power module 102 through the first connecting portion C1 and the second connecting portion C2 transmits to the mobile phone. Whereby, the cover plate assembly 100 can be regarded as a power bank of the mobile phone.

The accommodating portion 200 includes an output interface 2002 and an external power interface 2004. The output interface 2002 disposes on the inner side of the accommodating portion 200. The external power interface 2004 disposes on the outer side of the accommodating portion 200. The flexible printed circuit board FP electrically connects between the output interface 2002 and the first connecting portion C1, to construct a power transmission path between the first connecting portion C1 and the mobile phone. Therefore, after the protective cover of the power bank 10 is assembled with the protective case 20, the power bank 10 supplies power to the mobile phone.

The external power interface 2004 electrically connects an external power source to receive a commercial power source, and converts the commercial power source into an electrical power in line with the electricity of the mobile phone, the power bank 10 and/or a combination of one or more thereof. That is, the mobile phone protective case 1 of the present embodiment charges the mobile phone, the power bank 10 and/or a combination of one or more thereof.

For convenience of explanation, the present disclosure discloses that the cover plate assembly 100 and the protective case assemble with each other to form a mobile phone protective case 1 to illustrate, but the present disclosure does not limit the cover plate assembly 100 and the protective case. That is, the cover plate assembly 100 and the protective case can be a mobile phone with an integrated design. The cover plate assembly 100 and the protective case can be a mobile phone protective case without being removable.

Figure 3:
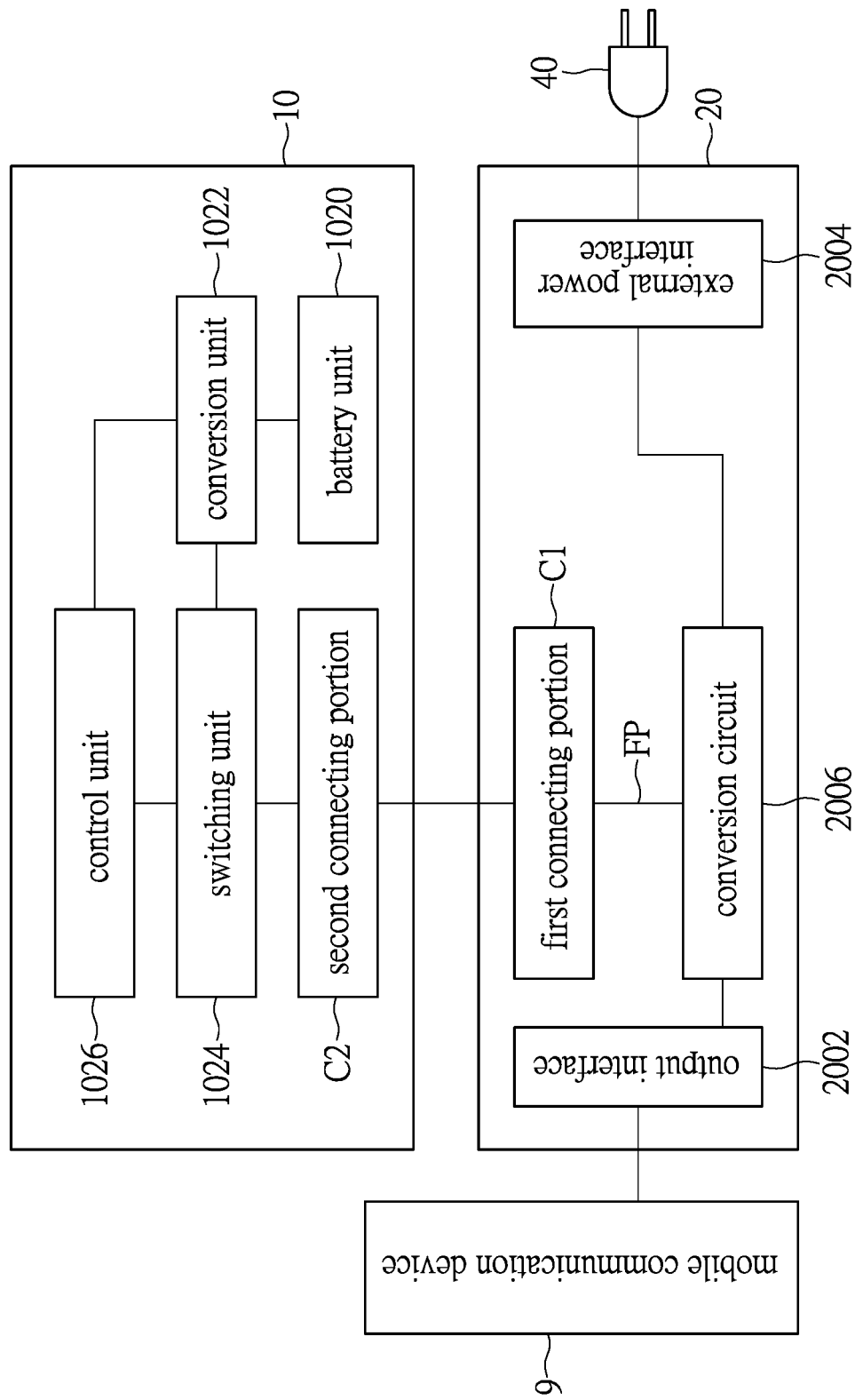
FIG. 3 is a functional block schematic diagram of a power bank and a protective case according to FIG. 2 provided in accordance with another exemplary embodiment of the instant disclosure.

FIG. 3 is a functional block schematic diagram of a power bank and a protective case according to FIG. 2 provided in accordance with another exemplary embodiment of the instant disclosure. As shown in FIG. 3, the power module 102 includes a battery unit 1020, a conversion unit 1022, a switching unit 1024 and a control unit 1026. The battery unit 1020 disposes on the lid portion 1002. The conversion unit 1022 electrically connects to the battery unit 1020, the control unit 1026 and the switching unit 1024. The switching unit 1024 electrically connects to the second connecting portion C2.

The battery unit 1020 implements through lithium batteries, nickel hydrogen batteries, nickel cadmium batteries or other batteries. The conversion unit 1022 is a direct current (DC) to direct current (DC) converting circuit which is implemented through a boost circuit, a buck circuit, buck-boost circuit and/or a combination of one or more thereof. The control unit 1026 implements through circuits of semiconductor electronic components, such as a control circuit, a processing circuit or an analyzing circuit. The switching unit 1024 has at least one transistor. The control unit 1026 is for controlling the switching unit 1024 switching on/off. The above disclosure is not intended to limit the battery unit 1020, the transforming unit 1022, the switching unit 1024 and the control unit 1026 of the present invention.

Additionally, in the other embodiments, the power module 102 further includes a protective unit which is implemented through a regulator circuit, a filter circuit, an overcharge protective circuit, an over-current protective circuit, an over-voltage protective circuit and/or a combination of one or more thereof. A person of ordinary skill in the art could design the power module 102 and the protective unit freely.

The operation mode of the power module 102 in the present embodiment differentiates in accordance with whether the mobile phone protective case 1 is assembled or not. Before the mobile phone protective case 1 is assembled, the cover plate assembly 100 and the protective case 20 are individual elements operating independently. The second connecting portion C2 does not connect to the first connecting portion C1. Users use an external power source to charge the battery unit 1020 of the cover plate assembly 100 via the second connecting portion C2. Wherein, if the control unit 1026 determines that the external power source is in line with the electricity of the battery unit 1020, the control unit 1026 controls a charging circuit, connecting between the second connecting portion C2 and the battery unit 1020, to conduct.

After the mobile phone protective case 1 is assembled, the protective case 20 and the cover plate assembly 100 are assembled with each other to form a mobile phone protective case 1. Since the second connecting portion C2 connects to the first connecting portion C1, the operation mode of the power module 102 differentiates in accordance with whether the mobile phone protective case 1 is connected to the external power source or not.

In the case where the external power interface 2004 is not electrically connected to the external power source, a power supply circuit from the second connecting portion C2 via the first connecting portion C1 and conversion unit 1022 to the output interface 2002 is turned on, to make the mobile phone be charged by the battery unit 1020. In addition, a person of ordinary skill in the art can design a button switch or a toggle switch. When the second connecting portion C2 connects to the first connecting portion C1, the mobile phone starts to be charged by the battery unit 1020 via the user pressing the button switch or the toggle switch. The above disclosure is not intended to limit the operation mode of the power module 102.

The external power interface 2004 can electrically connect to the external power source. A power supply circuit coupling between the external power interface 2004 and the output interface 2002 is turned on. After the conversion unit 210 converts and regulates a commercial power source from the external power source, the output interface 2002 transmits the power to the mobile phone. Or another power supply circuit coupling between the external power interface 2004 and the first connecting portion C1 is turned on. Then, after the conversion unit 210 converts and regulates a commercial power source from the external power source, the external power interface 2004 transmits the power to the battery unit 1020. That is, the external power source charges the mobile phone, the battery unit 1020 and/or a combination of one or more thereof via the external power interface 2004.

When a user separately uses the battery unit 1020 of the cover plate assembly 100, the cover plate assembly 100 can be used as a power bank. Or, the cover plate assembly 100 charges the battery unit 1020 directly via the external power source. When a user separately uses the protective case 20, the protective case 20 through the external power source can charge the mobile phone directly, since the cover plate assembly 100 and the protective case 20 are assembled with each other. The battery unit 1020, the mobile phone and/or a combination of one or more thereof can be charged directly from the external power source. Or the battery unit 1020 supplies power to charge the mobile phone. The above disclosure is not intended to limit the mobile phone protective case 1 of the present invention.

Figure 4:
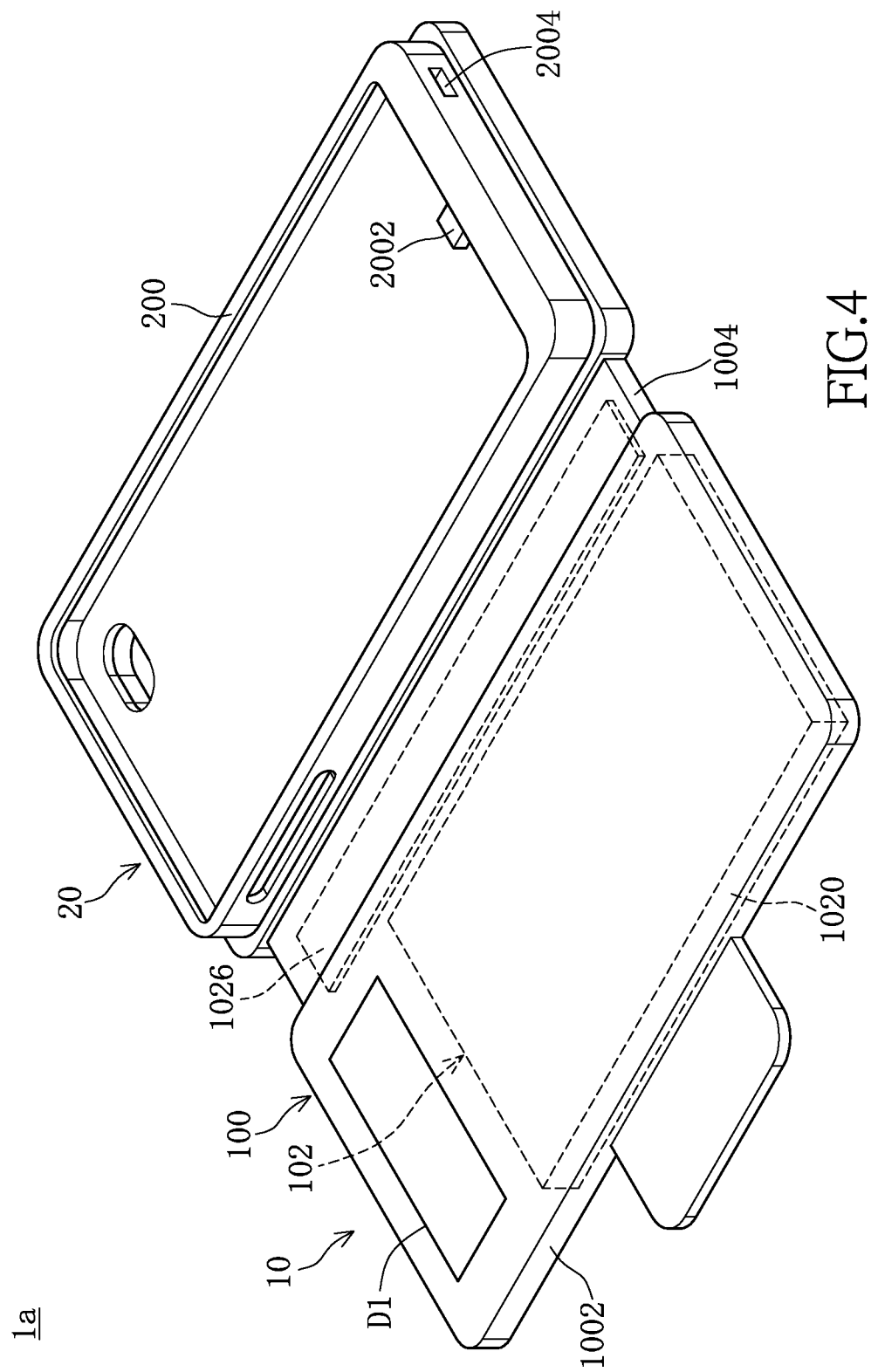
FIG. 4 is a schematic diagram of a power bank and a protective case according to another exemplary embodiment of the instant disclosure.

FIG. 4 is a schematic diagram of a power bank and a protective case according to another exemplary embodiment of the instant disclosure. As shown in FIG. 4, the mobile phone protective case 1a of the present embodiment is similar to the mobile phone protective case 1 of the above-mentioned embodiment in FIG. 2. However, there are differences between the protective case 1 and the protective case 1a. That is, the protective case 1a further includes a display module D1. The display module D1 electrically connects the conversion unit 1022 or the battery unit 1020, for displaying electricity information of the battery unit 1020.

The display module D1 implements through a pilot lamp, a liquid-crystal display (LCD) panel or other monitors. The display module D1 displays electricity, storage electricity or battery temperature of the battery unit 1020. The above disclosure is not intended to limit the display module D1 of the present invention.

To sum up, the instant disclosure provides a power bank and a protective case with the same power bank. When users separately use the battery unit of the cover plate assembly, the cover plate assembly can be used as a power bank. When users separately use the protective case, the protective case through the external power source can charge the mobile phone directly. When the cover plate assembly and the protective case are assembled with each other, the battery unit and the mobile phone can be charged directly from the external power source, or the battery unit supplies power to charge the mobile phone. Additionally, due to the battery unit of the cover plate assembly providing long-term and stable power to the mobile communication device, the mobile communication device can avoid damage from overheating. As a result, the present disclosure really enhances the ease of operation, efficiency and quality of the smart ultra box and its protective case.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A power bank, adapted to a protective case protecting a mobile communication device, the protective case having an accommodating portion and a first connecting portion, the mobile communication device removably disposed in the accommodating portion, the power bank comprising:
   a cover plate assembly, having a lid portion, a folded portion and a second connecting portion, the folded portion connected between the lid portion and the second connecting portion; and
   a power module, configured to the cover plate assembly;
   wherein the cover plate assembly is for assembling with the protective case, the cover plate assembly and the protective case assemble with each other to form a mobile phone protective case; when the cover plate assembly is as a separate power bank, the cover plate assembly is removed from the protective case;
   wherein the power module comprises a battery unit, a conversion unit, a switch unit and a control unit, the battery unit disposes in the lid portion, the conversion unit electrically connects to the battery unit, the control unit and the switch unit, and the switch unit electrically connects to the second connecting portion;
   wherein, a width of the folded portion is greater than a thickness of the mobile communication device; when the lid portion covers a touch screen of the mobile communication device, the folded portion disposed on the mobile communication device side.

2. The power bank according to claim 1, wherein the conversion unit is a direct current (DC) to direct current (DC) converting circuit, the switch unit is at least one transistor, and the control unit is for controlling the switch unit switching on/off.

3. The power bank according to claim 1, wherein the first connecting portion and the second connecting portion respectively having magnetic button assembly, and the first connecting portion and the second connecting portion are electrical connection ports to correspondingly connect to each other.

4. The power bank according to claim 2, wherein the second connecting portion is an electromagnet used for generating mutual magnetic attraction with the first connecting portion when the electromagnet is energized.

5. The power bank according to claim 1, wherein the lid portion is used for cover the accommodating portion, the lid portion revolves to a cover plate position via the folded portion, the cover plate position is a relative position of the lid position with respect to the accommodating portion, and the cover plate assembly and the protective case assemble with each other to form a mobile phone protective case with a protective cover plate.

6. The power bank according to claim 1, wherein the folded portion having a width which is greater than a thickness of the mobile communication device, and the lid portion revolves and covers the accommodating portion via the folded portion.

7. The power bank according to claim 1, further comprising a display module electrically connecting the conversion unit or the battery unit, for displaying electricity information of the battery unit.

8. A protective case, adapted to install a mobile communication device, the protective case comprising:
   an accommodating portion, to house the mobile communication device; and
   a power bank as claimed in claim 1 in which the power bank assembling with the accommodating portion.

9. The protective case according to claim 7, further comprising a bottom plate portion, wherein the bottom plate portion is an outer casing of the protective case, a flexible printed circuit board extends to the first connecting portion from the outer casing, and a terminal of the flexible printed circuit board electrically connects to the first connecting portion.

10. The protective case according to claim 8, wherein the accommodating portion comprises an output interface and an external power interface, the output interface disposes on an inner side of the accommodating portion, the external power interface disposes on the outer side of the accommodating portion, and the flexible printed circuit board electrically connects to the output interface.

11. The protective case according to claim 9, wherein the power module supplies power to the mobile communication device via the second connecting portion assembling with the first connecting portion.

* * * * *